United States Patent
Konradt et al.

(10) Patent No.: US 10,910,777 B2
(45) Date of Patent: Feb. 2, 2021

(54) CHARGING CONNECTION FOR A MOTOR VEHICLE

(71) Applicant: AUDI AG, Ingolstadt (DE)

(72) Inventors: Kevin Konradt, Lenting (DE); Sami Robert Zaki, Regensburg (DE); Thomas Jobst, Stammham (DE); Florian Auberger, Kösching (DE)

(73) Assignee: AUDI AG, Ingolstadt (DE)

( * ) Notice: Subject to any disclaimer, the term of this patent is extended or adjusted under 35 U.S.C. 154(b) by 82 days.

(21) Appl. No.: 15/825,721

(22) Filed: Nov. 29, 2017

(65) Prior Publication Data
US 2018/0175563 A1    Jun. 21, 2018

(30) Foreign Application Priority Data

Dec. 15, 2016  (DE) .................. 10 2016 225 143

(51) Int. Cl.
| | |
|---|---|
| *H02J 7/00* | (2006.01) |
| *H02J 7/14* | (2006.01) |
| *H01R 13/70* | (2006.01) |
| *B60L 53/16* | (2019.01) |
| *B60L 53/18* | (2019.01) |
| *H01R 13/639* | (2006.01) |

(Continued)

(52) U.S. Cl.
CPC ............ *H01R 13/701* (2013.01); *B60L 53/16* (2019.02); *B60L 53/18* (2019.02); *H01R 13/639* (2013.01); *H01R 24/20* (2013.01); *H01R 2107/00* (2013.01); *H01R 2201/26* (2013.01); *Y02T 10/70* (2013.01); *Y02T 90/12* (2013.01)

(58) Field of Classification Search
CPC .................................................... B60L 11/1818
USPC .......................................................... 320/109
See application file for complete search history.

(56) References Cited

U.S. PATENT DOCUMENTS

| | | | |
|---|---|---|---|
| 8,075,329 B1 | 12/2011 | Janarthanam et al. | |
| 8,550,833 B2 * | 10/2013 | Martin ............... | H01R 13/6395 439/310 |

(Continued)

FOREIGN PATENT DOCUMENTS

| | | |
|---|---|---|
| CN | 102448766 A | 5/2012 |
| CN | 102858585 A | 1/2013 |

(Continued)

OTHER PUBLICATIONS

German Office Action dated Oct. 12, 2018, in connection with corresponding DE Application No. 10 2016 225 143.0 (11 pgs., including machine-generated English translation).

(Continued)

*Primary Examiner* — Alexis B Pacheco
(74) *Attorney, Agent, or Firm* — Maier & Maier, PLLC

(57) ABSTRACT

A charging connection for a motor vehicle for connecting the motor vehicle to a connection element of a motor vehicle-side charging device in order to charge a motor vehicle-side energy storage device by the charging device. The charging device is provided with at least one current line for a current contact which is connected to the charging current, and with at least one signal line for communication between the motor vehicle and the signal contact connected to the charging device. The charging device is provided with a switching device which disconnects the signal contact from the signal line upon an actuation of the switching device.

9 Claims, 1 Drawing Sheet

(51) Int. Cl.
  *H01R 24/20* (2011.01)
  *H01R 107/00* (2006.01)

(56) References Cited

U.S. PATENT DOCUMENTS

| | | | | |
|---|---|---|---|---|
| 2012/0029728 A1* | 2/2012 | Hirayama | B60L 53/60 | 701/1 |
| 2012/0091958 A1* | 4/2012 | Ichikawa | B60L 3/0046 | 320/109 |
| 2012/0133326 A1* | 5/2012 | Ichikawa | B60L 15/007 | 320/109 |
| 2013/0069425 A1* | 3/2013 | Kanazawa | H01M 10/44 | 307/9.1 |
| 2014/0170879 A1* | 6/2014 | Kahara | B60L 1/003 | 439/304 |
| 2015/0123610 A1* | 5/2015 | Zaki | B60L 3/0046 | 320/109 |
| 2016/0039298 A1* | 2/2016 | Herzog | B60L 11/1818 | 320/109 |
| 2016/0207409 A1 | 7/2016 | Ueo | | |
| 2018/0126861 A1* | 5/2018 | Dorndorfer | B60L 11/1846 | |

FOREIGN PATENT DOCUMENTS

| | | |
|---|---|---|
| CN | 202797473 U | 3/2013 |
| CN | 105473372 A | 4/2016 |
| DE | 69218450 T2 | 6/1997 |
| DE | 102009044179 A1 | 12/2010 |
| DE | 102010053072 A1 | 8/2011 |
| DE | 102011050998 A1 | 6/2012 |
| DE | 102012217278 A1 | 4/2013 |
| EP | 2 980 955 A1 | 2/2016 |
| KR | 2012-0126299 A | 11/2012 |

OTHER PUBLICATIONS

Examination Report dated Jun. 22, 2017 of corresponding German application No. 10 2016 225 143.0; 6 pgs.
Examination Report dated Nov. 17, 2017 of corresponding German application No. 10 2016 225 143.0; 10 pgs.
Office Action dated Apr. 11, 2019, in corresponding Chinese Application No. 201711337497.6 including partial machine-generated English language translation; 12 pages.
Office Action dated Sep. 27, 2019, in corresponding Chinese Application No. 201711337497.6; 18 pages.

* cited by examiner

CHARGING CONNECTION FOR A MOTOR VEHICLE

FIELD

The invention relates to a charging connection for a motor vehicle for connecting the motor vehicle with a connection element of a vehicle-external charging device in order to charge a motor-vehicle side energy storage device by a charging current provided by a charging device, wherein the charging device is provided with at least one current contact, which is connected to a current line for the charging current, and with at least one signal contact, which is connected to a signal line for communication between the motor vehicle and the charging device.

BACKGROUND

Plug-in hybrid vehicles and electric vehicles are often provided with wired charging systems. Meanwhile, standardized plug types and charging modes are frequently used for such electric vehicles. A number of standardized plug types are standardized in the IEC 62196 standard.

In order to enable sufficiently fast charging, very high direct currents or alternating currents are conducted through corresponding charging connections. For example, up to 250 amperes are provided in so-called mode 3 charging mode.

However, a withdrawal of a plug during such a charging operation, which is to say while a voltage is applied to current-conducting poles of the corresponding charging plug, can lead to the formation of an electric arc and thus it can cause damage to the motor vehicle or to the charging device. That is why known charging plugs are mechanically locked. A corresponding locking operation can be carried out for examples by the actuators of the motor vehicle before the charging process is started.

However, a quick disconnection of a charging plug from a corresponding socket is desired in some cases, and the charging plug should be also removable in cases when the relevant actuators fail. That is why emergency unlocking can be provided, which cancels the mechanical lock. However, when such emergency unlocking is realized by means of electric actuators, it is possible that the emergency unlocking may not be possible under certain fault conditions, for example when a control cable of a corresponding actuator is broken. However, the freedom that is required with respect to the voltage and current for conversion by a charging device cannot be guaranteed with a purely mechanical conversion of an emergency unlocking system.

Document DE 10 2009 044 179 A1 discloses a charging plug for an electric vehicle. This vehicle is provided with a fuse part by means of which the charging plug can be secured at the electric vehicle. In order to remove the charging plug, the fuse part is lifted from the securing projection. To make this possible, the actuating element must be first released by a locking device 12. When the locking device is actuated, a position sensor, for example a micro-switch, is additionally also actuated, which results in an interruption of the charging current. A disadvantage is in this case that two separate lines are required for the micro-switch in order to detect the actuation of the micro-switch by a charging device. In addition, the charging device must be also modified in such a way that the current flowing to the charging plug is interrupted in the event of a an interruption of the connection. This method would therefore also require a much more complicated design of the connecting lines and moreover, it could be implemented only with suitably modified charging devices.

SUMMARY

The objective of the invention is therefore to achieve in a technically simple manner a design providing freedom for the current when the charging cable is removed, in particular in the context of emergency unlocking.

This objective is achieved with the charging connection mentioned in the introduction, which is equipped with a charging device that disconnects during an activation of the switching device the signal contact from the signal line.

According to the invention it is proposed to separate a signal line, which is used for communication between the motor vehicle and the charging device, so that a signal can be provided to the charging device that a charging current should be disconnected without requiring additional line connections. For example, in the case of the plugs discussed in the introduction, the pilot contact line is interrupted for mode 3 of the charging modes. By default, the charging device detects the resistance between a relevant pin of the connection element of the charging device and another pin, in particular of the protective conductor. If the line associated with the pilot contact is interrupted, the resistance will be infinite or at least very large. Charging is by default carried out only when this resistance is 880 Ohms or less. Therefore, an interruption of a signal line within the charging connection of the motor vehicle can be achieved even with conventional devices that are used today so that the charging current will be reduced to zero. The method according to the invention thus makes it possible to achieve with a minimal technical expenditure freedom for the current and the voltage when the charging connection is disconnected from the connection element, wherein a mechanical switching device is actuated.

It is preferred when only one signal line or several signal lines are disconnected by the switching device. As was already mentioned in the introduction, a disconnection of the lines that are potentially carrying charging current is not desirable because an electric arc can occur. The switching device thus in particular does not interrupt the current line with respect to the charging current.

The charging connection may be in particular a charging socket according to IEC 62196 Mode 3. In particular, it may be a type 2 connector, which is commonly referred to as Mennekes connector. However, it may be also a charging connection that is additionally or alternatively provided with connections for charging with direct current, for example a Combo 2 coupling.

The switching device can separate the signal contact from the signal line mechanically. The charging device is preferably a mechanically activated switching device, for example a micro switch, a toggle switch, or a rotary switch. As an alternative, the switching device could be also actuated electronically. For example, it could be a relay.

The charging connection can be provided with a locking element that is movable between a locking position and an unlocking position, wherein a form-fitting connection can be produced with the locking element in the locking position, and wherein the charging connection is provided with an unlocking element, upon the actuation or activation of which, the locking element is moved into the unlocking position. The separation of the connection element from the charging connection is possible in the unlocked position, while it is blocked in the locking position. The unlocking device can be used in particular for emergency unlocking. For example, it may not be possible to release the connection element due to an electric defect in the motor vehicle. Electric or mechanical unlocking may be provided for the locking element in order to still make it possible to disconnect the motor vehicle from the charging device or from its connection element.

It is preferred when the unlocking device is configured in such a way that when it is actuated, the charging device is additionally actuated. As explained above, this makes it possible to ensure that the current line or the current lines of the connection element will be free of current when the connection element is removed from the charging connection.

The unlocking device can be designed as a purely mechanical device, and it can be for example activated for example by means of a Bowden cable. It is also possible that the unlocking device is for example activated in order to release the charging connection and to actuate the switching device when a certain button or combination of buttons is activated on the operating element of the charging connection or the like.

Additionally or alternatively, it is also possible that the unlocking device is actuated automatically under certain conditions, in particular when sufficiently large forces act upon the connection element and/or on the components of the charging device. If for example large tensile forces act upon the connection element, for example when the motor vehicle is rolling away, then the connection element can be automatically unlocked and the switching device can be actuated so as to keep the current line or the current lines without current.

The unlocking device can comprise an actuating element for actuation of the unlocking device by means of a force transmission device used on the side of the motor vehicle, which is coupled in motion with the locking element and with the switching device in such a way that when the actuation element is actuated, the locking element is moved into the unlocked position and the switching element is mechanically actuated. The motion coupling can be carried out for example by means of a Bowden cable, or with any other coupling means. A Bowden cable can be also used as a force transmission device, for example to conduct an actuating force from an actuating element within a passenger compartment to the charging connection or to its actuating element.

In addition to the charging connection according to the invention, the invention also relates to a motor vehicle comprising an energy storage device and a charging device by means of which a charging operation with a charging current that is provided by a vehicle-external charging device can be controlled with the charging operation of the energy storage device, wherein the motor vehicle comprises a charging connection according to the invention, and wherein the signal line is electrically connected to the charging device to enable communication between the charging control device and the charging device after the connection of the connection element. The current line is preferably coupled directly or indirectly to the electric system of the motor vehicle. The coupling can be realized for example with a current conditioning device that can be controlled in a particular manner. This can be used for example for voltage conversion, or for conversion for from direct voltage to alternating voltage. The current-conditioning device can be controlled by means of the charging control device, for example to make it possible to match the impedance during the charging of the energy storage device, or to enable charging with different charging voltages.

The motor vehicle may include an operating element, which is coupled in motion via a force transmission device to an actuating element of the charging connection, which is coupled in motion to the locking element and to the switching device in such a way that when the operating element is actuated, the locking element is moved into the unlocked position and the switching device is actuated mechanically. The actuating element and/or the force transmission device can be also designed as described above.

The motor vehicle-side charging device can be configured to detect a disconnection of the signal line from the signal contact and when a disconnection is detected, to interrupt and/or transmit an interruption signal to the charging device. A disconnection of the signal line from the signal contact can be in particular recognized when a signal that is repeatedly detected as being transmitted from the charging device to the charging control device is no longer detected. The interruption signal can be transmitted by means of another signal line and/or wirelessly to the charging device.

The invention additionally also relates to a charging arrangement comprising a motor vehicle according to the invention and a charging device, by means of which a charging current can be provided for charging the energy storage device of the motor vehicle, wherein a connection element of the charging device is connected to the charging device of a control device, by means of which the charging current can be controlled as a function of vehicle information, which can be provided from a control device via the charging device. The connection element can be locked by the locking element explained above in the charging connection. When a manual or automatic unlocking of the locking element is performed by the unlocking device of the motor vehicle mentioned above, the signal line is automatically disconnected with the actuation of the switching device. In a suitable charging device, the result may be that the charging current provided via the current line or current lines will be lowered to zero.

In this case it is in particular possible that the control device is equipped with a measuring device, by means of which the resistance between the signal contact and another line led by a contact element and the charging connection to the charging device, in particular a protective conductor or a neutral conductor, can be detected as motor vehicle information, wherein the charging current is reduced to zero when the detected resistance exceeds a predetermined limiting value. As a result, a reduction of the charging current to zero can be achieved with a small technical expenditure when the switching device is actuated.

BRIEF DESCRIPTION OF THE DRAWINGS

Further advantages and details of the invention will become apparent from the following embodiments and from the accompanying figures, which schematically illustrate the following.

DETAILED DESCRIPTION OF THE DRAWINGS

Figure 1:
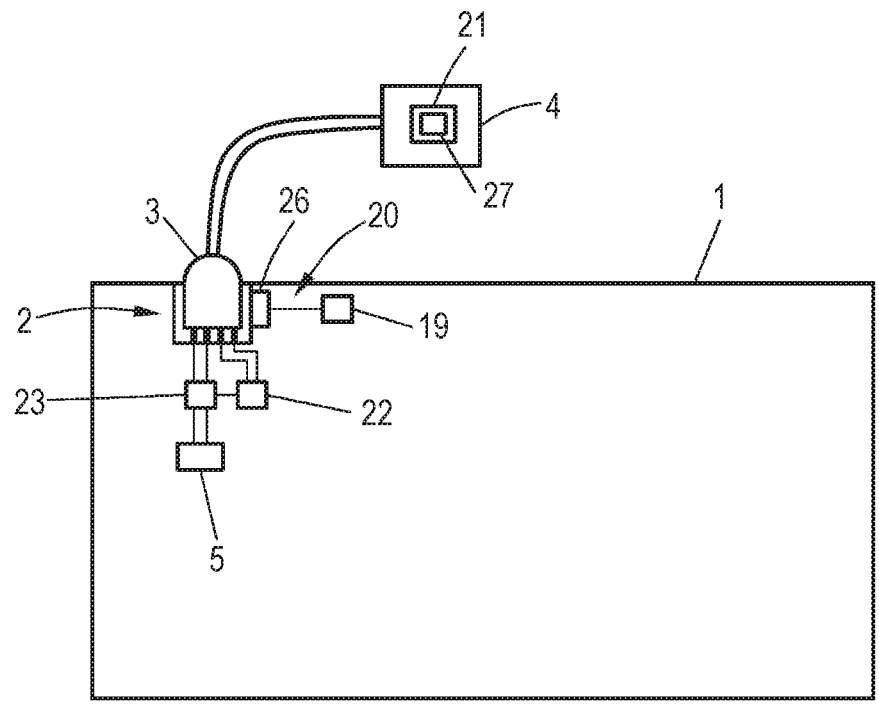
FIG. 1 a charging arrangement according to the invention which comprises a motor vehicle and a charging device, and FIG. 2 a detailed view of a charging connection according to the invention of the motor vehicle according to the invention shown in FIG. 1.
Figure 2:
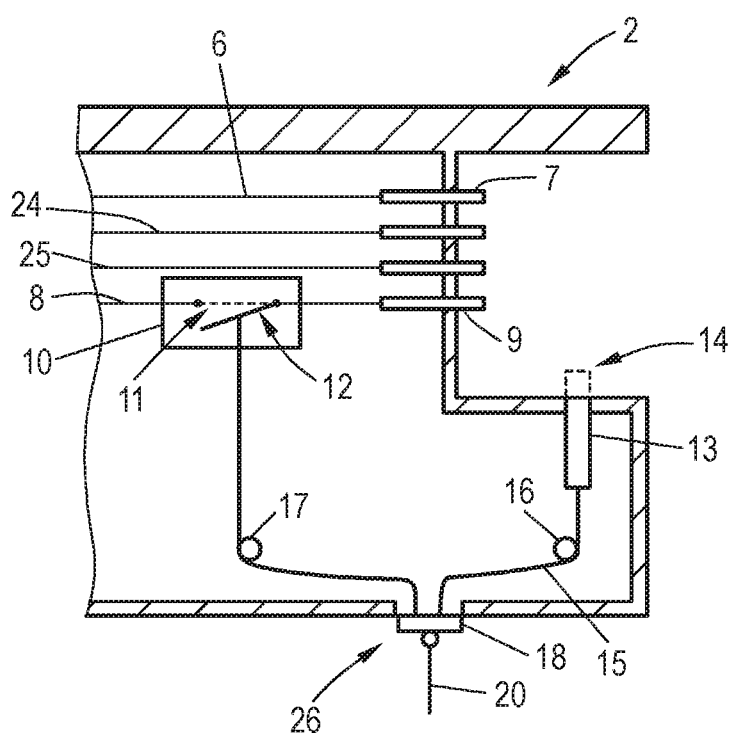

FIG. 1 shows a charging device in which an energy storage device 5 of a motor vehicle 1 is charged by a charging device 4. For this purpose, a connection element 3 of the charging device 4 is connected to a charging connection 2 of the motor vehicle 1. The charging connection 2 is illustrated in detail in FIG. 2. For the sake of clarity, only four contacts of the charging connection are shown. Real charging connections or connection elements are typically provided with a large number of contacts. For example IEC 62196 type 2 plug is provided with two signal lines, in particular a pilot contact and a control pilot, a neutral conductor, a protective conductor and three current lines for the different phases of a three-phase current. In addition or as an alternative to these current lines, additional contacts can be also provided for direct current charging.

After connecting the connection element 3 to the charging connection 3, the connection element 3 is locked with a locking element 13 so that it is shifted to the locked position 14. This can be carried out for example with an actuator, not shown, which is controlled by the charging control device 22 in order to lock the connection element 3 before the charging of the energy storage device 5 is started.

A current contact 7 and a signal contact 9, as well as two other contacts, are connected in the shown example with the connection of the connecting the element 3 to the charging connection 2. By means of the current contact 7 and the current line 6 which is connected to it, the current can be supplied from the charging device 4 via the current conditioning device 23, which can be controlled by the charging control device 22, to the energy storage device 5. For this purpose, the current conditioning device 23 is additionally connected to the neutral conductor 24.

The communication between a control device 21 on the side of the charging device and the charging control device 22 on the side of the motor vehicle takes place via a signal line 8, which is conducted through the signal contact 9. The charging device 4 can for example signal by means of the signal line 8 via the current intensities that can be provided, for example by means of pulse width modulation. Back communication from the charging control device 22 on the side of the motor vehicle to the charging device 4 is also possible, for example so that different resistances between the signal line 8 and another line 25, for example a protective conductor, are connected.

In the charging arrangement shown here it may occur that a regular shifting of the locking element 13 from the locked position 14 into the unlocked position shown by the full line may not be possible due to a defect or due to another failure or for another reason, regardless of what should occur based on the control that is carried out by means of the charging control device 22. To make this possible, an unlocking device 26 is provided in the charging connection 2, by means of which the locking element 13 can be pulled from the locked position 14 into the unlocked position shown by the full line. For this purpose, the unlocking device 26 is provided with a movable actuation element 18, which is coupled to the locking element 13 via a force transmission device 15, which comprises two Bowden cables deflected by the deflecting elements 16, 17. The force transmission element 15 couples the actuation element additionally also to the switching device 10 so as to actuate it when the unlocking device is actuated. In the example shown here, a switch 12 is pulled directly from a closed position 11, in which it connects to the signal line, into the open position shown here. It goes without saying that it could be also possible to design or actuate the switching device differently. For example, a micro-switch that is actuated with the Bowden cable or the like can be also used.

The interruption of the signal line 8 can be detected via the control device 21 of the charging device 4. For this purpose, the resistance between the signal line 8 and another line 25, which is conducted via the connection element 3 and the charging connection 2 to the charging control device 22, for example to the protective conductor, is detected by the measuring device 27. If this resistance exceeds a predetermined limiting value, the charging current is reduced by the charging device 4 to zero. When the connection element 3 is removed from the charging connection 2, the current contact 7 thus becomes free of voltage, so that the connection element 3 can be safely removed.

In principle it would be possible to operate the unlocking device 26 directly on the charging connection 2. However, in some cases it is not desirable when an actuation of the unlocking device 26 is allowed, additionally or as an alternative, from another location of the motor vehicle. An operating element 19 can be provided for this purpose, for example in the interior of the motor vehicle 1, which is coupled in motion to the unlocking device 26 or to its actuating element 18 via a force transmission device 20, for example a Bowden cable. As a part of the motion coupling, for example a transmission or a reduction can be provided to make it possible to provide activation paths or actuating forces that can be freely selected.

The invention claimed is:

1. A charging connection for a motor vehicle for connecting the motor vehicle to a connection element of a charging device which is external to the motor vehicle in order to charge a motor vehicle-side energy storage device by a charging current provided from the charging device, the charging connection comprising:
   at least one current line for a current contact connected to the charging current;
   at least one signal line for communication between the motor vehicle and a signal contact connected to the charging device;
   a switching device configured to disconnect the signal contact from the signal line upon actuation of the switching device;
   an unlocking device operatively connected to the switching device, so that upon activation of the unlocking device, the switching device is additionally actuated; and
   a locking element that is movable between a locked position and an unlocked position, the locking element creating a form-fitting connection with the connection element in the locked position,
   wherein a charging control device of the vehicle is configured to control the locking element so as to move the locking element into the locked position,
   wherein the unlocking device, upon the actuation or activation thereof, moves the locking element into the unlocked position regardless of the control that is carried out by the charging control device.

2. The charging connection according to claim 1, wherein the switching device is configured to disconnect the signal contact from the signal line mechanically.

3. The charging connection according to claim 1, wherein the switching device is a mechanically activated switching device.

4. The charging connection according to claim 1, wherein the unlocking device comprises a movable actuation element which is movable by a user or by a motor vehicle-side force transmission device, the movable actuation element being motion-coupled to the locking element and to the switching device in such a way that upon an actuation of the actuation element, the locking element is moved into the unlocked position and the switching device is mechanically actuated.

5. A motor vehicle having the charging connection according to claim 1, comprising:
   an energy storage device; and
   a charging control device that controls a charging operation of the energy storage device with a charging current provided by the motor vehicle-external charging device, wherein the signal line is electrically connected to the charging device to enable, after connecting the connection element of the charging device, a communication between the charging control device and the charging device.

6. The motor vehicle according to claim 5, further comprising:
   an operating element, which is motion-coupled by a force transmission device to an actuating element of the charging connection, which is motion-coupled to the locking element and the switching device in such a way that upon an actuation of the operating element, the locking element is moved into the unlocking position and the switching device is mechanically actuated.

7. The motor vehicle according to claim 5, wherein the charging device is configured to detect a disconnection of a signal line from a signal contact and when a disconnection is detected, to interrupt a charging operation and to transmit an interruption signal to the charging device.

8. A charging device that provides a charging current for charging an energy storage device of a motor vehicle, the charging device comprising:
   a connection element configured to connect to a charging connection of the motor vehicle, wherein the charging device controls the charging current via a control device as a function of motor vehicle information, and provides the charging current via a signal line through a signal contact, and
   wherein the charging device is provided with a switching device that disconnects the signal contact from the signal line upon an actuation of the switching device;
   wherein the charging connection is provided with a locking element that is movable between a locked position and an unlocked position, the locking element creating a form-fitting connection with the connection element in the locked position;
   wherein the switching device is actuated upon actuation of an unlocking device operatively coupled to the switching device; and
   wherein the unlocking device, upon the actuation or activation thereof, moves the locking element into the unlocked position regardless of the control that is carried out by the charging control device.

9. The charging device according to claim 8, wherein the control device is provided with a measuring device for detecting a resistance between the signal line and another line, conducted via the connection element and the charging connection to a charging control device, as motor vehicle information, and
   wherein the charging current is set to zero when the detected resistance exceeds a predetermined limiting value.

* * * * *